C. E. HOPKINS.
STEREOTYPE APPARATUS.
APPLICATION FILED APR. 26, 1909.

1,160,985.

Patented Nov. 16, 1915.
8 SHEETS—SHEET 1.

WITNESSES:
John W. Thompson
R. McGrann

INVENTOR
Charles Edward Hopkins
by Riddle Wendell & Varney
Attys

C. E. HOPKINS.
STEREOTYPE APPARATUS.
APPLICATION FILED APR. 26, 1909.

1,160,985.

Patented Nov. 16, 1915.
8 SHEETS—SHEET 3.

FIG. 3.

WITNESSES:
John W. Thompson

INVENTOR
Charles Edward Hopkins
by Riddle Wendell & Varney
Attys.

C. E. HOPKINS.
STEREOTYPE APPARATUS.
APPLICATION FILED APR. 26, 1909.
1,160,985.
Patented Nov. 16, 1915.
8 SHEETS—SHEET 4.
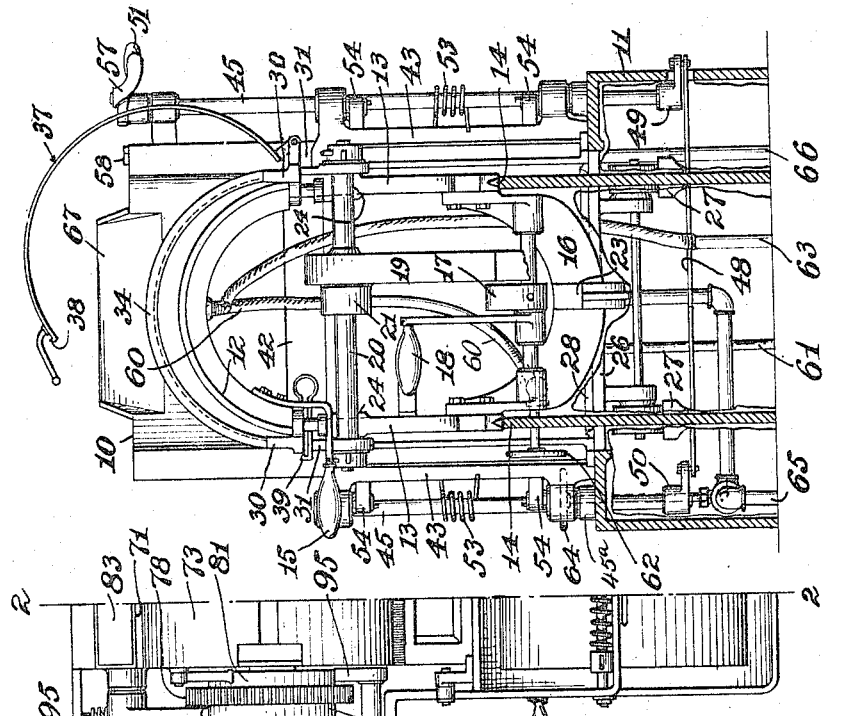
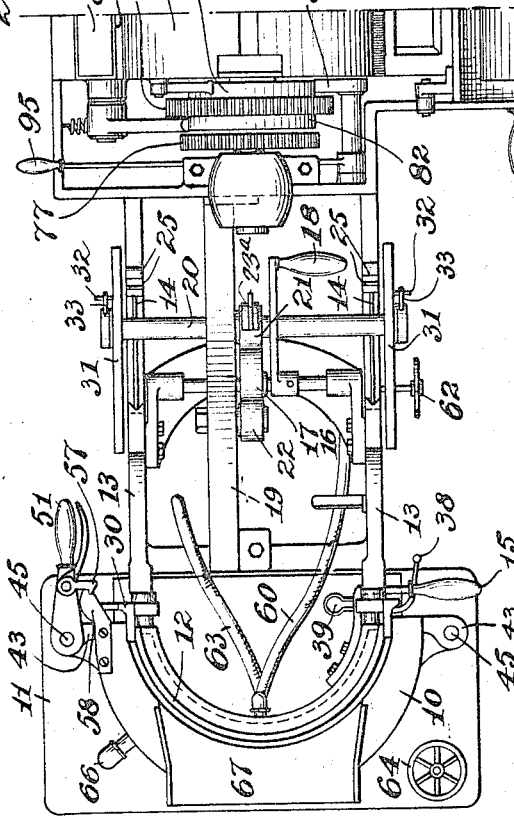
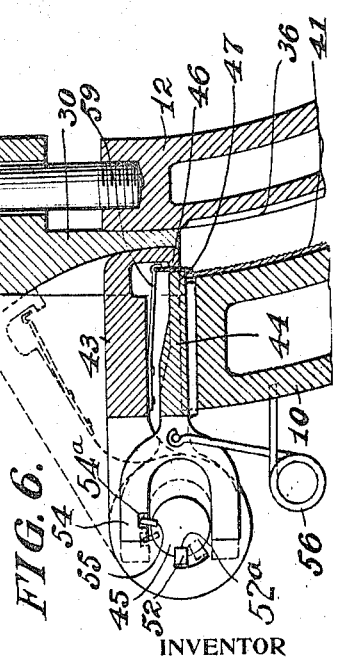
WITNESSES:
John W. Thompson
G. McGraw
INVENTOR
Charles Edward Hopkins
by Riddle Wendell & Varney,
Attys.

C. E. HOPKINS.
STEREOTYPE APPARATUS.
APPLICATION FILED APR. 26, 1909.
1,160,985.
Patented Nov. 16, 1915.
8 SHEETS—SHEET 5.
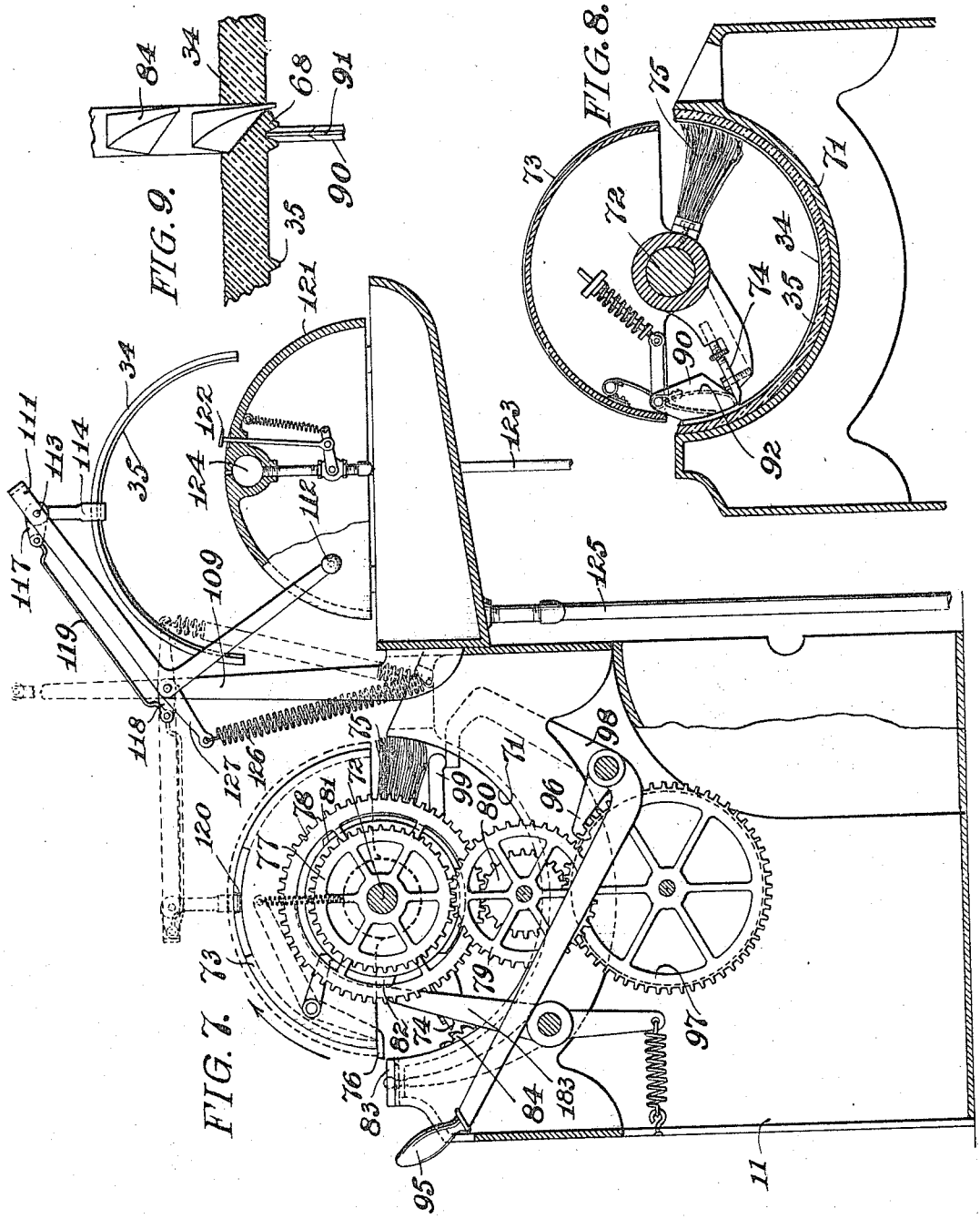
WITNESSES:
John W. Thompson
G. McGrann
INVENTOR
Charles Edward Hopkins
by Liddle Wendell & Varney
Attys.

C. E. HOPKINS.
STEREOTYPE APPARATUS.
APPLICATION FILED APR. 26, 1909.

1,160,985.

Patented Nov. 16, 1915.
8 SHEETS—SHEET 6.

WITNESSES:
John W. Thompson
G. McGrann

INVENTOR
Charles Edward Hopkins
by Riddle Wendell Varney
attys.

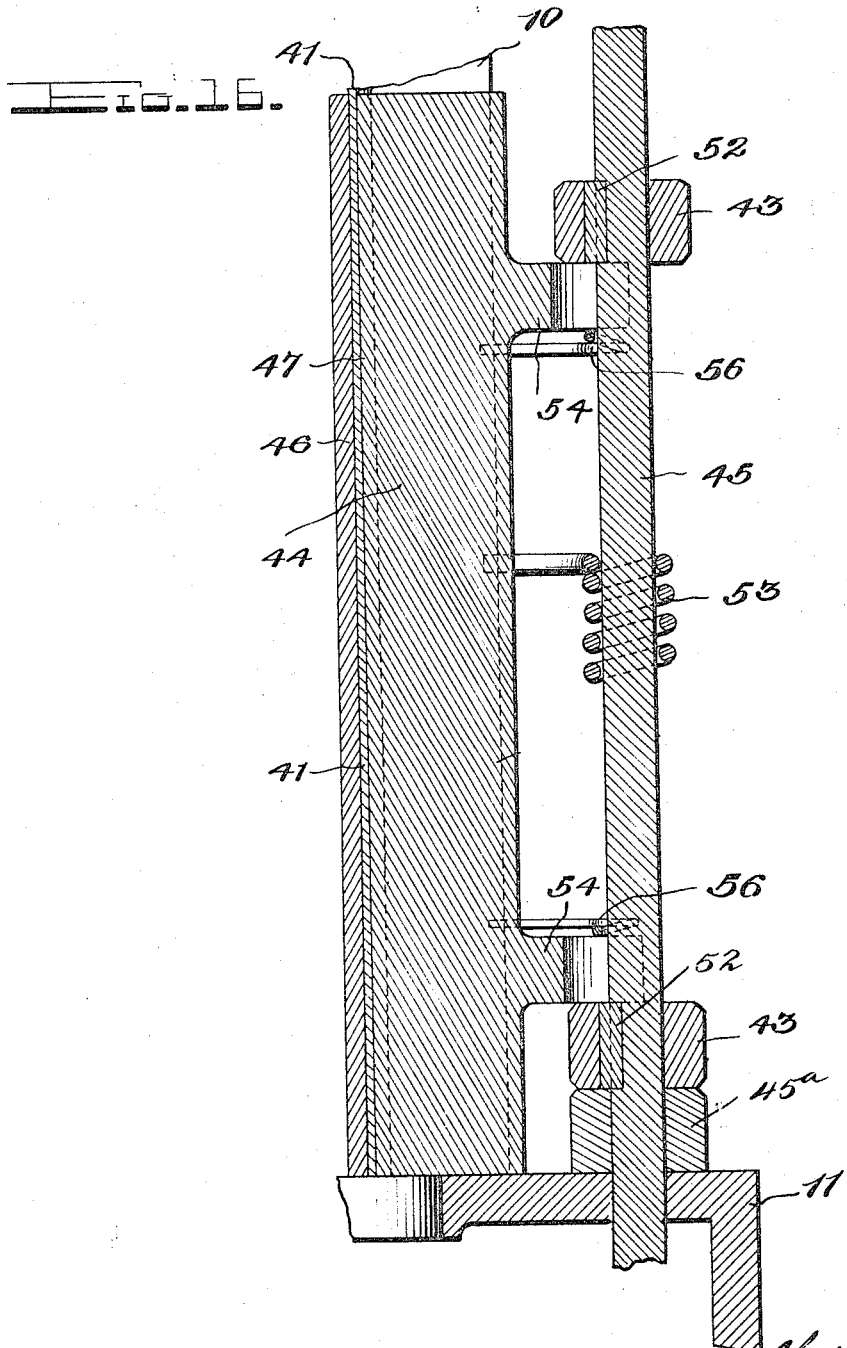

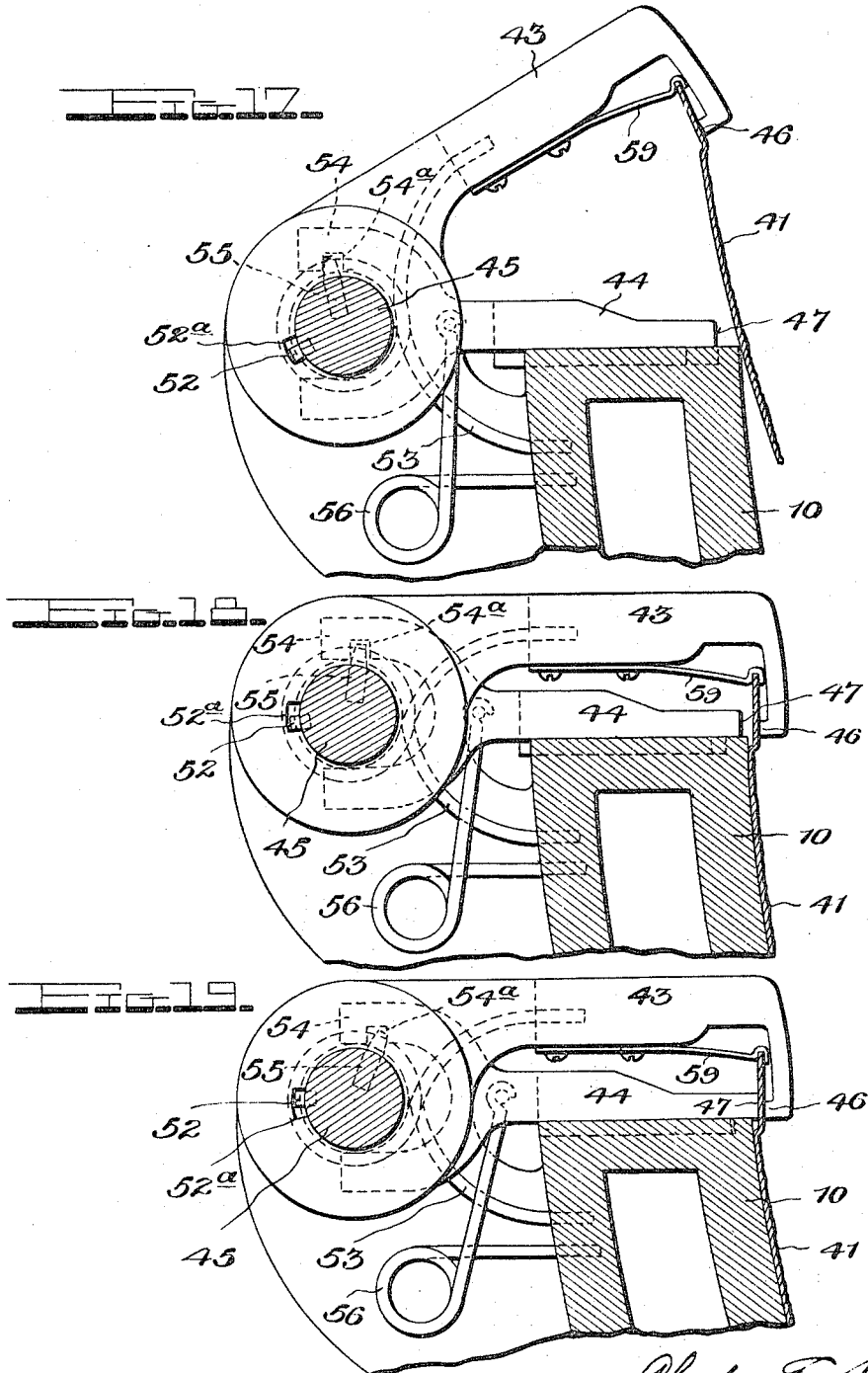

UNITED STATES PATENT OFFICE.

CHARLES EDWARD HOPKINS, OF PHILADELPHIA, PENNSYLVANIA.

STEREOTYPE APPARATUS.

1,160,985.   Specification of Letters Patent.   Patented Nov. 16, 1915.

Application filed April 26, 1909.   Serial No. 492,103.

*To all whom it may concern:*

Be it known that I, CHARLES EDWARD HOPKINS, a citizen of the United States, and at the present time a resident of the city of Philadelphia, in the county of Philadelphia and State of Pennsylvania, have invented certain new and useful Improvements in Stereotype Apparatus, of which the following is a specification, reference being had to the accompanying drawings, forming a part hereof.

The object of the invention is to provide a machine for casting and finishing curved stereotype plates in a minimum of time and with a minimum of labor. The improvements have been devised largely with the idea of providing an apparatus which may be operated at a considerable speed by one man to cast, trim, shave and cool the stereotype plates so that they may be quickly finished and made available at once for attachment to the ordinary newspaper web perfecting printing presses.

The apparatus shown in the accompanying drawings is an embodiment of the invention which has been designed particularly for use in printing plants of second class newspapers where the saving of labor is important and where economy of time is necessary. This apparatus, also, is adapted to be operated in conjunction with any melting pot and pump that may already be installed on the premises.

Figure 1:
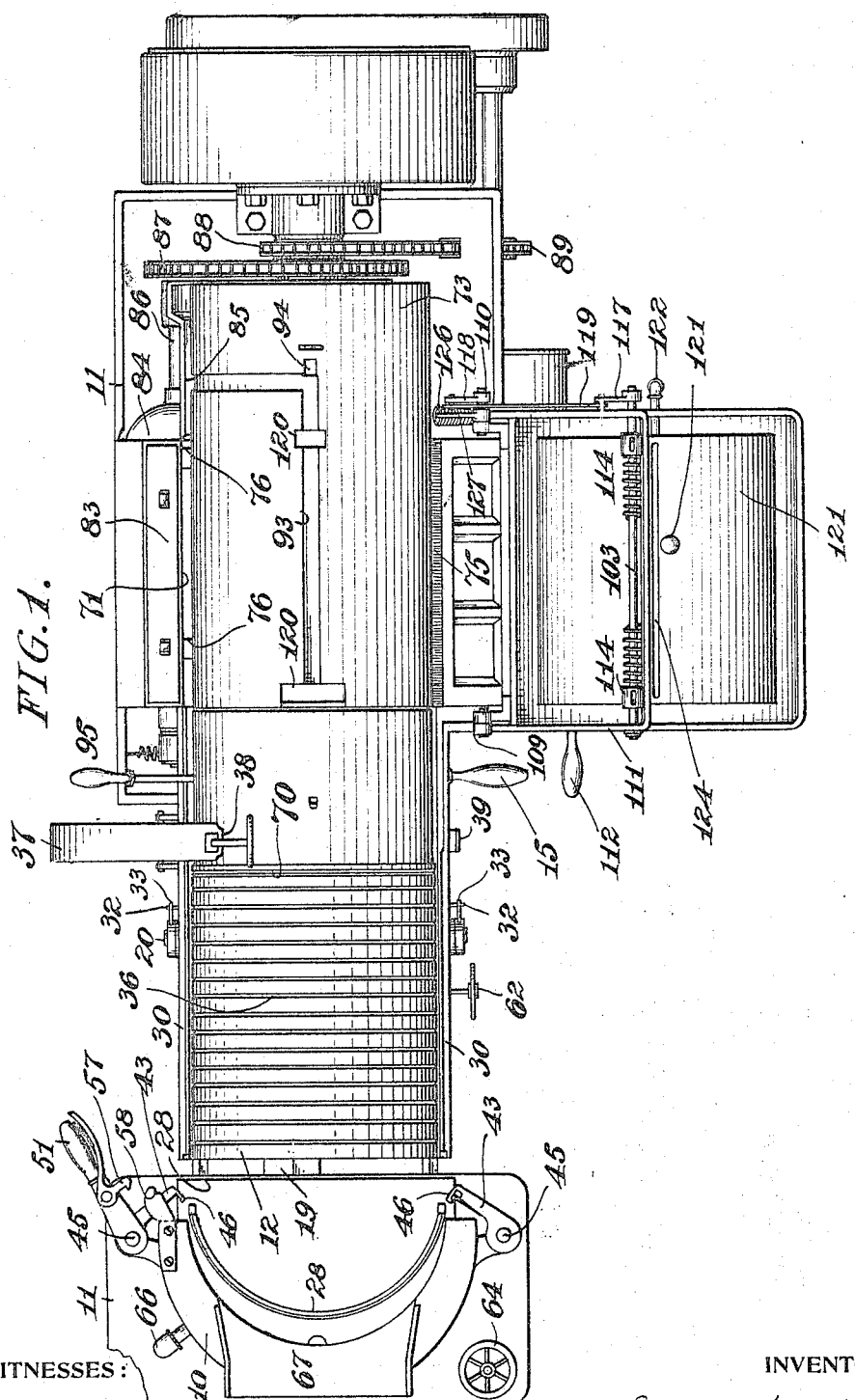
Figure 2:
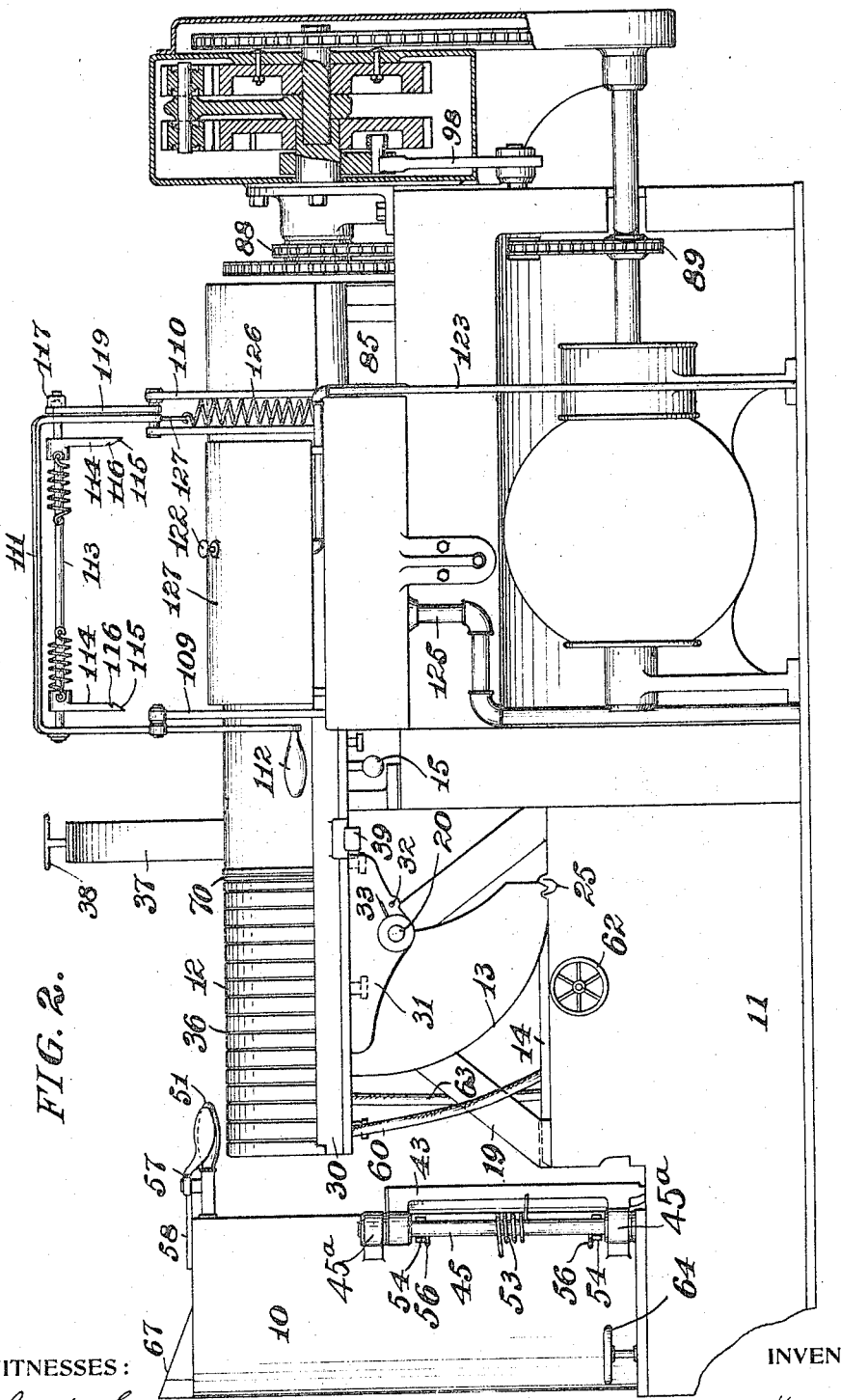
Figure 10:
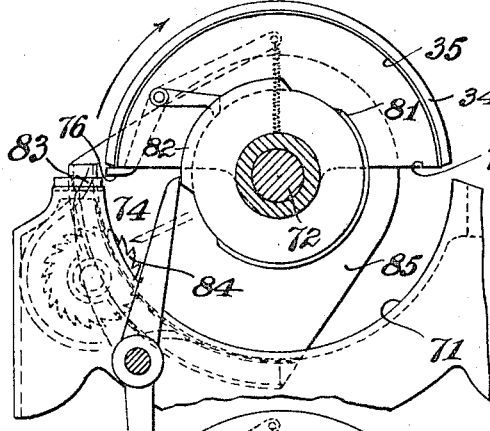
Figure 11:
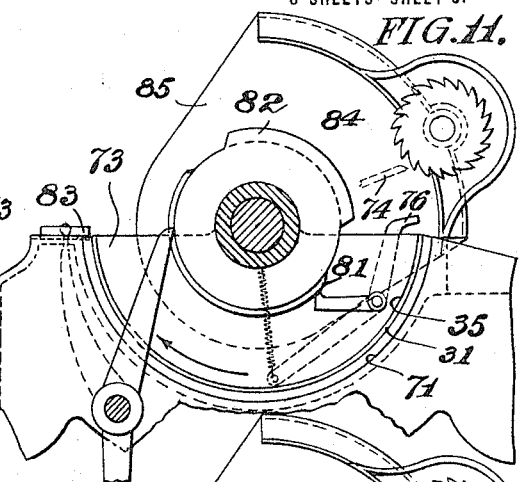
Figure 12:
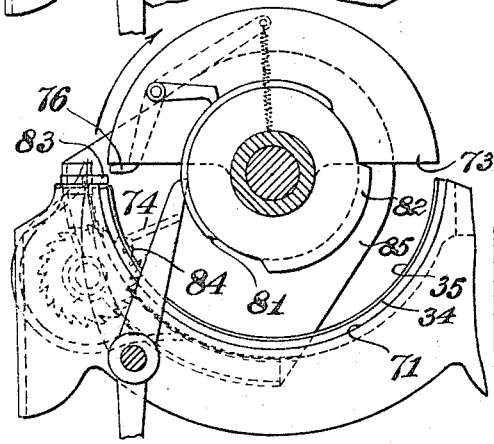
Figure 13:
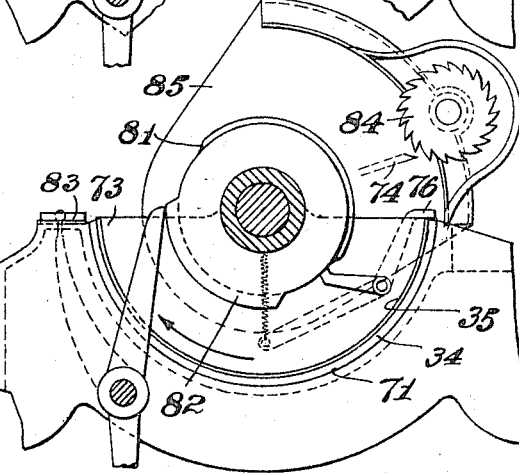
Figure 14:
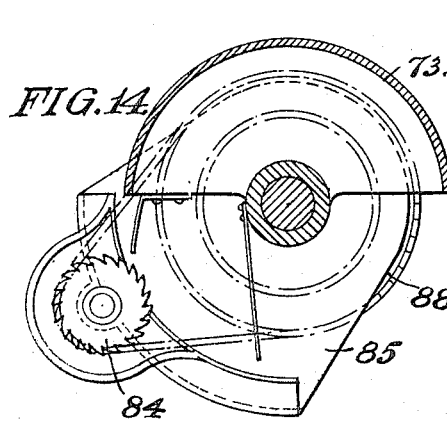
Figure 15:
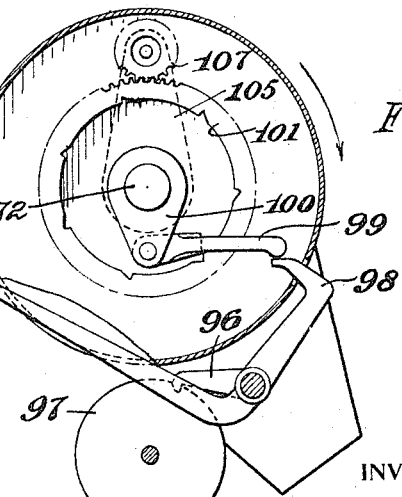

Referring to this machine and to the accompanying drawings, Figure 1 is a plan view of the machine with the core shown in its horizontal position. Fig. 2 is a view in side elevation showing the core in horizontal position with the flexible band 37 in extreme elevated position, and the speed reducing gearing in section. Fig. 3 is a view in central longitudinal section showing the core in horizontal position with a cast stereotype plate elevated above the same and the band 37 in locked position engaging the plate. Fig. 4 is a plan view of the casting mechanism, with the core in a vertical position and so as to form with the back a casting chamber. Fig. 5 is a view taken on the irregular plane indicated by the lines 4—4 in Fig. 3 with the flexible band 37 partly raised. Fig. 6 is a detail horizontal sectional view of one of the matrix clamps, the section being taken through the clamp between spring 53 and the lower spring 56. Fig. 7 is a transverse sectional view of the machine looking from the casting end toward the finishing end with the casting mechanism removed and the cooling mechanism shown partly in section. Fig. 8 is a sectional detail view of the finishing mechanism on a plane indicated by the line 2—2 of Fig. 3. Fig. 9 is also a detail sectional view showing a portion of a full sized stereotype plate being trimmed and a portion 91 of the holding means. Fig. 10 is a detail view in elevation showing a stereotype positioned upon the half-cylinder support or horse of the finishing mechanism. Fig. 11 is a similar view after the horse has made a one-half revolution. Fig. 12 is a similar view after the horse has completed one revolution. Fig. 13 is a similar view showing the horse after it has made a revolution and a half. Fig. 14 is a view showing the horse in section and the trimming mechanism taken upon a plane indicated by the line 3—3 in Fig. 3. Fig. 15 is also a detail view of a section taken partly on the plane indicated by the line 5—5 in Fig. 3 and also showing the starting level and holding means 96 and 97. Fig. 16 is a detail vertical sectional view of the matrix clamp at the right hand side of the back, the section being taken through the center of the bearing shaft and member 44, looking toward the back 10. Fig. 17 is a detail plan view of one of the matrix clamps in open position. Fig. 18 is a similar view showing the clamp partly closed. Fig. 19 is a similar view showing the clamp in closed position.

In the present machine, the back 10 is supported in an upright position at the rear end of the frame 11 to which it is securely fixed. Directly in front of the concave side of the back is the core 12 which is supported upon rockers 13 movable back and forth upon tracks 14 provided in the frame, and for the purpose of rocking said core from a horizontal position to a vertical position and back again, a handle 15 is secured to the core at one side thereof and near what may be referred to as the top end of the core. The object of thus rocking the core is to form with the back a chamber in which a curved stereotype plate may be cast from a matrix held in said chamber and which core with the plate and matrix may be withdrawn from the back and be moved from a vertical to horizontal position.

In forming the casting chamber, the core is first rocked into a vertical position in which position its lower end strikes and rests upon a carriage 26, shown clearly in Figs. 3 and 5 which is movable to and from the back on a track 27, and is normally held away from the back and in a position to receive the core by a spring 26ᵃ or the like. When the core has reached its vertical position with its lower end upon the carriage, the operator, by means of an operating lever 18 secured upon a shaft 16 which is journaled in extensions secured to the rockers, is able to advance the core and carriage by means of an eccentric 17 which is secured to shaft 16 and which engages rollers 21 and 22 up to the back to form the casting chamber. It should be observed that upon rocking the core into a vertical position the shaft 16 with eccentric 17 secured thereto, is moved from the position shown in Fig. 3 to the position shown in Fig. 4 where the eccentric 17 is positioned between two rollers 21 and 22. One of the rollers is journaled upon a stud fixed in a cross brace 19 and the other roller upon a shaft 20 which passes through and is fixed to the cross brace 19, and when the lever 18 is moved by the operator the eccentric 17 is turned between the rollers so as to advance the core and carriage (Figs. 3 and 4). In order to bring the core into exact vertical position and to maintain it in such position as it is being slided up to the back, a guide stop member 23 for limiting its turning, guiding its movement toward the back and for limiting said movement is secured to the rockers 13 and upon rocking the core from a horizontal into a vertical position is brought into contact with the roller 21. The position of this guide is such that when it strikes the roller 21 it will check the further rocking of the core, the latter being then exactly vertical, and during the sliding of the core up to the back, this guide 23 will travel upon the roller 21 thus maintaining the core constantly vertical, and when the core has reached the proper position to form the casting chamber, the curved end 23ᵃ of the guide 23 will embrace the roller 21 Fig. 4, thereby locking the core in casting position limiting further movement of the core and in combination with the eccentric the guide member 23 will hold the core vertical as the core is withdrawn from the back. When the core has been rocked back into its horizontal position the rocker will engage the cross shaft 20, and lugs 25 at the ends of the tracks 14 will engage in recesses in the lower end of the rockers, thus checking further movement of the core and holding it in a horizontal position. Upon the carriage 26 is a semi-circular end ring 28 which has a thickness corresponding to the thickness of the body of the stereotype to be cast. This ring has its concave face beveled in order to form a bevel on the lower end of the stereotype (Fig. 3). When the core is rocked into a vertical position, its lower end fits inside the ring 28, and it is through the medium of the ring 28 that the core pushes the carriage forward against the back. This ring 28 forms the lower end of the casting chamber and also serves to clamp the lower end of the matrix against the lower end of the back.

Movable upon studs fixed along each of the straight sides of the core are straight side bars or lifters 30. As shown in Figs. 1, 2, 4, 5 and 6, these side bars coöperate with the matrix clamps, hereafter to be described, to form the straight side walls or closures of the casting chamber. Coöperating with the side bars 30 are members 31 mounted upon the cross shaft 20 in such a way that they can turn on the shaft sufficiently to engage the underside of the side bars 30 when the core is rocked about midway between its two limiting positions.

The shaft 20 and members 31 occupy such a position relative the track 14, rockers 13 and side bars 30 carried by the core that upon the turning of the core away from the back to its horizontal position the members 31 engage the side bars 30 about midway the movement and during the latter part of the turning movement the side bars 30 in engagement with members 31 will be caused to move relative the core sufficiently to separate the stereotype plate and matrix from the core and be supported above the same by the bars and members 31, see Fig. 5. The movement of the plate from the core is sufficient to withdraw the ribs 35 from the grooves 36 cut in the convex face of the core.

Stop pins 32, on member 31, and 33, fixed to shaft 20, are provided to limit the movement of the member 31. Near the top of the core and pivoted to one of the side bars 30 is a more or less flexible band or tailpiece 37, the free end of which is provided with a catch hook 38 and a handle for moving the band on to and off from the core; and the other side bar 30 is provided with a spring actuated catch 39 which the hook 38 of the band engages when the latter is positioned over the core (Figs. 1, 2, 4 and 5). The object of the band is to prevent molten metal from running behind the matrix. The reduced portion 40 of the band, as will be seen, clamps the upper raised margin of the matrix 41 against the portion 42ᵃ of the back when the matrix is positioned in the back and the core has been moved into casting position. The upper portion of the band is preferably made heavy or thick, but in order not to reduce the thickness of the riser of the stereotype, a recess 42 is provided in the concavity of the bank in which the thickened portion of the band may rest when the core is in the casting position. That portion of the concavity of the back 41ª which supports the type portion of the matrix 41 has a greater diameter than the portions 42ª and 42ᵇ which support the curved margins of the matrix. The matrix, moreover, is molded with suitable corresponding raised margins on all four edges for the purpose of causing the edges of the stereotype next to the type face to be cast lower than the type face and thereby to do away with the hand or machine operations which would otherwise be required to finish its edges.

Referring now more particularly to Figs. 6, 16, 17, 18 and 19 where the matrix clamps are shown in enlarged detail, it will be seen how the side bars 30 together with the matrix clamps form the side closures or walls of the casting chamber. The matrix clamps themselves consist of jaws 46 and 47 formed by the abutting edges of pivoted members 43 consisting of flat bars, and sliding members. The members 43 are pivoted to upright shafts 45 arranged in bearings 45ª near the straight sides of the back and extend one on each side from the end ring 28 to the flexible band 37 or recess 42, see Fig. 3. The sliding members 44 also consisting of bars extending between the end ring 28 and recess 42 are attached to the straight sides of the back so that they can be slid away from and toward the concave side of the back. In the present case the pivoted members 43 are mounted in bearings upon their respective shafts 45 and each is provided with a key 52 fast upon the shaft which operates in an elongated key-way 52ª in each of the respective bearings. A spring 53, coiled about the shaft and having one end bearing upon the corresponding pivot member, tends to force said member to the closed position and therefore to cause it to follow its key when the shaft is rotated toward the closed position and to press against said key when the shaft is turned in the opposite direction. The slot 52ª and key 52 in each bearing limit the relative movement between the shaft 45 and the pivoted member 43.

Each sliding member 44 is provided on its rear edge near each end thereof with a yoke 54 embracing shaft 45, which shaft is provided with two keys 55 respectively operating in elongated key-ways 54ª, one of which is formed in one arm of each yoke. A spring 56 engages each yoke and tends to push the slide member forward against the key toward the closed position.

The operation of the clamps then is as follows: A matrix having first been slightly curved is slipped down behind the jaws 46 (when in the position shown in dotted lines in Fig. 6) of the clamps with its type side facing inwardly, to the position in which the bottom of the matrix rests upon the carriage 26 between the end ring 28 and the back, and one of the straight edges of the matrix is in engagement with or is ready to be engaged by a spring 59 which is provided within one of the pivoted members 43. The other straight edge is adapted to be brought up against the straight interior of the opposite pivoted member 43. The operator now, while holding the top of the matrix with one hand, moves a handle 51 with the other hand to close the jaws, said handle being connected to the top of one of the shafts 45 and both shafts being connected at the bottom by a link 48 and crank arms 49 and 50. The first movement of the handle allows the pivoted members 43 to be moved into closed position by their springs 53, such movement serving, through the spring 59, to quickly position the matrix between the jaws or clamps. This same movement of the handle allows the sliding members 44 to advance sufficiently so that their forward ends 47, which with the ends 46 of the pivoted members form the jaws, are proximate to but not yet closed upon the matrix edges. A further movement of the handle now permits the springs 56 to force the sliding members 44 into tight engagement with the matrix edges so that the jaws are now closed upon the matrix on both sides; and a still further movement of the handle causes the keys 52 and 55 to advance across their respective key-ways and to engage both members of the jaws and hold them tightly and positively in closed position. In this position, the handle is locked by a catch hook 57 engaging a catch 58 fixed to the top of the back. In opening the clamps, the operation just described is reversed, as will be readily understood without further description. From Fig. 6 it will be seen that before the core can be withdrawn with the stereotype plate, the matrix clamps must move back out of the way, and in dotted lines in that figure is shown the position of one of the matrix clamps when the handle 51 has been moved back after the casting. When thus moved back, the clamps are out of the way, the matrix has been released, and the core and plate are removed with the matrix adhering to the face of the plate.

The construction just described not only provides a very satisfactory means for moving the clamps into and out of position to allow for the movement of the core and plate, but furthermore constitutes a matrix clamp which operates just as well with a matrix of one thickness as with a matrix of another thickness. In other words the spring actuated jaws will close tightly upon a thin matrix as well as upon a thick matrix and moreover they will close tightly when no matrix at all is provided thus preventing the molten metal from running in between the members of the jaws when the casting chamber is filled with molten metal, as when casting a "warmer". Another advantage of the spring actuated jaw members is that they obviate the danger of the matrix being held too tight and thereby broken through shrinkage or improper positioning. There is also the advantage, which has already been referred to, of the automatic positioning of the matrix between the jaws. Heretofore this has been done manually, the operator depending upon his skill, experience and accurate eyesight in determining the proper position for the matrix sheet. In the present case the operator simply lays the matrix in the clamps, as heretofore explained, and allows the closing of the clamps to bring the matrix automatically into its final and correct position.

In order to cause the metal to congeal quickly after the casting, both the core and the back are preferably made hollow and are adapted to be connected to a source of water supply. The core, for instance, is provided with a flexible tube 60 which connects with a water supply pipe 61 provided with a valve 62, the waste water being carried away through a flexible tube 63. The back is provided with a supply pipe 65 and a valve 64 and a waste pipe 66. Moreover, the back is provided with a flaring opening 67 in order to facilitate the flow of molten metal into the casting chamber.

Referring now to the finishing mechanism, it will be remembered that after the casting and the withdrawal of the core from the back, the plate is left raised slightly above the core in the position shown in Figs. 3 and 5. After the matrix has been stripped from the plate in this position and the plate has been released by the unfastening of the tail piece or band 37, it is slided longitudinally by the operator upon a support or horse 73 which is in alinement with the core while the latter is in its horizontal position. The plate is positioned upon the horse by having a lug 69 cast therein which, when the plate has reached its proper position upon the horse, abut against an adjustable stop 94. The horse is semi-cylindrical in shape and is rotatable about a shaft 72, the rotation of the horse being adapted to transfer the plate therefrom to a stationary bed 71 directly underneath the horse and of a length equal to the type face of the stereotype. While in this bed, the stereotype is finished by being trimmed and shaved.

For the purpose of transferring the stereotype from the horse to the bed, (Figs. 10 to 13), one edge of the horse is provided with movable fingers 76 which when closed are flush with the cylindrical face of the horse but when in operation protrude sufficiently to engage the edge of the stereotype thereupon. In this way, when a stereotype is placed upon a horse and the horse is revolved, the fingers during the first half revolution of the horse are kept in engagement with the plate by a spring but at the end of the first half revolution the fingers 76 are withdrawn against the action of the spring by means of a cam 81. At the same time that the fingers are withdrawn, or substantially the same time, a stop 83 along one edge of the bed is moved into operative position by a cam 82 and thus serves to check the further rotation of the stereotype plate which by this time is resting upon the bed the horse, however, continuing upon its second half revolution. During this second half revolution of the horse and while the plate is resting upon the bed, the plate is shaved and trimmed by a knife 74 and a saw 84 respectively. The knife 74, which is of a length equal to the finished plate, is positioned so as to engage and slide upon the ribs of the plate, being secured to the shaft 72 of the horse, a brush 75, also secured to the same shaft, following the knife and brushing out the interior of the stereotype after it has been shaved. The saw 84 is carried upon one end of a shaft 86 journaled in a segmental extension 85 of the horse and is driven at high speed through sprockets 87 and 88 which are connected by a sprocket chain and the latter of which is a double sprocket and is mounted freely upon the shaft 72 so as to be driven from a sprocket 89 fast to the driving shaft. It will thus be seen that the saw 84 is driven independently of the horse but moves with the horse so as to cut off the riser portion of the plate. From Figs. 11 and 12 it will be seen that the plate is trimmed during the second half revolution of the horse and that during this half revolution the extension 85 (Figs. 2, 3 and 10 to 14), which is about a quadrant in width, forms a support for the riser portion of the stereotype as it is being separated from the type face portion of the plate and thus prevents the severed portion from twisting or bending the plate on account of its unsupported weight. From Fig. 13 it will be seen that upon the commencement of the fourth half revolution of the horse, the fingers 76 upon one edge of the horse will again be caused to protrude through the action of the cam 81 and will engage one of the straight edges of the stereotype plate, and that simultaneously the stop 83 along one edge of the bed will be moved back out of the path of the plate through the cam 82. The continued rotation of the horse therefore will now remove the plate from the bed and at the end of the second complete revolution of the horse the plate will again rest upon the horse and the latter will be in the position from which it started where it will be checked through the operation of a clutch presently to be explained. It should be noted that while the plate is resting in the bed and is being operated upon by the shaving knife and trimming saw, the edge 91 of a flat plate 90, which serves as a holding means, (Figs. 8 and 9) moves in a groove formed between two ribs 68 cast in the concave side of the stereotype by grooves 70 (Fig. 3) in the core, such plate being held in the groove by springs. In this way the plate is maintained in the proper position during the finishing and is also held firmly down upon the bed.

The cams 81 and 82 are fixed to a gear 78 (Fig. 3) which is freely mounted upon the shaft 72 and is in mesh with a gear 80 fast to a gear 79 which latter gear is in mesh with a gear 77 fast to the shaft 72. This arrangement is such that the cams 81 and 82 will revolve but once during two revolutions of the horse.

The shaft 72 is driven from the main driving shaft of the apparatus through the interposition of reduction gearing whereby a reduced speed is obtained for the horse without the loss of power which accompanies the use of worm gearing which is ordinarily provided for this purpose. This reduction gearing (Fig. 3) comprises a gear 101 operating loosely upon the shaft 72, a gear 108 coaxial therewith but fixed from rotation, as by being secured to the casing of the gearing, and a pinion 106—107 divided as shown so as to mesh with both gears and be carried by a crank arm 105 secured to a short shaft 104 journaled in one end of the shaft 72 and in the gear casing. This short shaft 104 is driven by a sprocket 103 connecting with the driving shaft 102 of the machine and causes the crank arm to revolve and carry the pinion 106—107 around the gears 101 and 108. As one of these gears 108 has a larger number of teeth than the other gear 101, each revolution of the crank arm 105 will cause the gear 101 to be advanced by as many teeth as are represented by the difference between the number of teeth between the gear 108 and the gear 101. In this way, it will be seen, that the speed of the gear 101 can be made as slow as desired.

The gear 101 is made to drive the horse 73 and its shaft 72 through the interposition of a clutch which is shown clearest in Fig. 15. In this figure the shaft 72 will be seen to be provided with an arm 100 which is fast to said shaft and which has pivoted thereto a clutch pawl 99 adapted to engage with one of a series of notches cut into the interior face of the rim of the gear 101. Normally the pawl 99 is lifted by one arm of a clutch lever 98 so that the gear 101 revolves freely without moving the shaft 72.

When however the operator has moved a stereotype plate on to the horse and is ready to start the finishing device in operation, he lifts the handle 95 of the starting lever and thereby disengages the end of the pawl 99 from the arm 98 of the starting lever and permits said pawl to engage in one of the notches in the rim of the gear 101. This starts the horse rotating and the finishing devices in operation. The starting lever is provided with a hook 96 which, while the finishing devices are in operation, rides upon the face of a cam 97. This cam is secured to a gear which meshes with the gear 80 and is rotated once for every two revolutions of the horse. It is also provided with a notch which the hook 96 is adapted to engage, and when in the revolution of the cam 97, the hook 96 drops into the notch, it permits the starting lever to return to its first position and the arm 98 to check the movement of the pawl 99 by moving in the path thereof and thereby cause a disengagement of it from the notch in the gear 101 with which it is in engagement. The hook 96 also serves as a means for locking the cam 97 which has a geared connection to the horse and thereby locks or holds the horse in the desired position. Thus, as is obvious, the further revolution of the horse will be checked, and it will be seen that due to the mechanism just described the horse will turn through two complete revolutions each time the clutch is operated by the starting lever 95.

After the plate has been operated upon by the finishing means and the horse has returned to its first position with the plate thereon, it is then lifted by manually operated transfer means from the horse and deposited on a semi-cylindrical support 121 constituting a part of the cooling means. This transfer means is shown best in Figs. 2 and 7. It includes two uprights 109 and 110 at one side of the horse 73, and between these uprights there is pivoted a carrying frame 111 operated by a lever 112 having depending spring fingers 114 provided with beveled ends 115 and notches 116 near said ends. These fingers are pivoted upon a shaft 113 where they are slidable along the shaft under the action of their springs and said shaft is provided with a crank arm 117 which is connected by a link 119 with an extension 118 upon the upright 110, the object of which is to keep the arms 114 always vertical as the frame swings from one side of the uprights to the other. The horse is provided with recesses 120 into which the beveled ends of the arms 114 can enter so that after the stereotype has been finished, the operator, by turning the operating lever 112 may force the bevels of the arms 114 down over the bevel of the finished stereotype and into the recesses 120 of the horse as shown in dotted lines in Fig. 7. This causes the arms to separate against the action of their springs and a further movement pushes the arms down far enough to cause the notches 116 to engage upon the ends of the stereotype. Then the operator reverses the movement of the transfer lever 112 thus lifting the stereotype from the horse and deposits it upon the support 121 of the cooling mechanism which is located beside the horse. This support is slightly longer than the stereotype and therefore when the stereotype is lowered upon this support the bevels of the arms 114 engage the ends of the support and cause the arms to be forced outwardly against the action of their springs and the plate to be disengaged from the notches 116 after which the frame 111 is raised through the action of its counterbalance spring 126 attached to one end of an arm 127. A valve 122 of the cooling mechanism is depressed by the plate, upon the latter being deposited upon the support 121, and permits water to flow from the supply pipe 123 into a distributing chamber at the apex of the cylinder having an elongated opening 124, from which chamber it flows up through a groove against the stereotype plate, flushing and cooling the same, the water thereafter being carried away by a pipe 125 which leads from a trough for cooling the water located underneath the support 121.

Although I have illustrated and described a preferred embodiment of the invention, I am aware of the fact that many modifications can be made therein by any person skilled in the art without departing from the scope of the invention as expressed in the claims. Therefore, I do not wish to be limited to all the details of construction herein shown and described, but

I claim as my invention:

1. In a stereotype apparatus, the combination with a fixed upright back, of a core movable to and from the back, means to bring the core into a substantially horizontal position with its casting face upward when it is withdrawn from the back, said core having means to withdraw the plate so that it may be presented in a horizontal position above the core when the latter has been moved into its horizontal position after the casting.

2. In a stereotype apparatus, the combination of a fixed upright back, a core movable to and from the back, and a carriage forming the bottom of the casting chamber and upon which the core is moved into position to form the casting chamber.

3. In a stereotype apparatus, the combination with a fixed upright back, of a core movable up to the back from a substantially horizontal position, rockers upon which the core is brought into a vertical position as it is thus moved, and a carriage upon which it is then advanced to form the casting chamber.

4. In a stereotype apparatus, the combination with a fixed upright back, of a core movable up to the back from a substantially horizontal position, rockers upon which the core is brought into a vertical position as it is thus moved, and a carriage having a ring forming the lower end of the casting chamber.

5. In a stereotype apparatus, the combination of a fixed upright back, a core movable to and from the back, a carriage having a semi-circular ring to form the lower end of the casting chamber, rockers to deliver the core to and from the carriage, a spring to keep the carriage normally in such a position that when the core is delivered thereto upon the rockers the lower end of the core will abut against the ring, and means to slide the core thus abutting against the ring into a position adjacent to the back to form the casting chamber.

6. In a stereotype apparatus, the combination of a fixed upright back, a core movable to and from the back, a carriage, rockers to deliver the core to and from the carriage, means to move the core while on the carriage into a position adjacent to the back to form the casting chamber, and means to keep the core in a vertical position while so moved.

7. In a stereotype apparatus, the combination with a fixed upright back, and a core adapted to be rocked from a horizontal position into a vertical position and then slidden up to the back, and vice versa, of an eccentric for so sliding the core, and a guide having a hooked end for keeping the core vertical while it is being slidden and for locking it in position when the casting chamber has been formed.

8. In a stereotype apparatus, the combination with a fixed upright back, and a core adapted to be rocked from a horizontal position into a vertical position and then slidden up to the back, and vice versa, of an eccentric movable with the core, two fixed rollers between which the eccentric is brought when the core is in a vertical position, and a guide having a hooked end adapted to embrace one of the rollers when the core has been moved into the casting position.

9. In a stereotype apparatus, the combination with a fixed upright back, of a core adapted to move from a substantially horizontal position up to the back and vice versa, and lifting means to raise the plate above the core during the last part of the movement of the latter while it is being moved back to its horizontal position after the casting.

10. In a stereotype apparatus, the combination with the back, of a core adapted to move from a substantially horizontal position up to the back and vice versa, said core having means to withdraw the cast plate, and lifting means for the plate on each side of the core, said lifting means constituting part of the closure for the casting chamber.

11. In a stereotype apparatus, the combination with the back, of a core adapted to move from a substantially horizontal position up to the back and vice versa, lifting strips slidable upon each side of the core, and means on each side of the frame of the apparatus to raise said strips automatically as the core reaches its horizontal position after casting.

12. In a stereotype apparatus, the combination with a fixed upright back, of a core, rockers for the core, and a track for the rockers, whereby the core may be rocked from a horizontal to a vertical position and vice versa, and means to slide the core while in a vertical position toward and from the back.

13. In a stereotype apparatus, the combination with a fixed upright back, of a core, rockers for the core, and a track for the rockers, whereby the core may be rocked from a horizontal to a vertical position and vice versa, and means to guide the core while it is advanced and to lock it when it has reached the casting position.

14. In a stereotype apparatus, the combination with the back, of a carriage, a core adapted to move up to and away from the back upon the carriage, and a ring upon the carriage adapted to form the lower end of the casting chamber and to overlap the lower end of the matrix.

15. In a stereotype apparatus, the combination with a fixed upright back and a movable core, of a carriage movable to and from the back, a ring fast to the carriage and adapted to hold the lower end of the matrix to the back, and a band pivoted to one side of the core and adapted to hold the top of the matrix against the back.

16. In a stereotype apparatus, the combination of a fixed upright back, a core movable to and from the back, a ring movable to and from the back and adapted to abut against the lower end of the back when the casting chamber is formed, and a spring operatively connected with the ring so that when the core is moved away from the back, the ring will follow it for a short distance.

17. In a stereotype apparatus, the combination with a fixed upright back, a core movable to and from the back, side strips adapted to move inwardly to close the casting chamber and overlap the matrix at the sides and then to move outwardly to release the matrix and permit the core, plate and matrix to be withdrawn.

18. In a stereotype casting apparatus, the combination with a back, of matrix holding means on each side of the back adapted to adjust the matrix in position against the back as said means moves into holding position, and resilient means for moving said matrix holding means into closed position.

19. In a stereotype apparatus, the combination with the back, of matrix holding means consisting of pivoted side members forming part of the closure of the casting chamber and adapted to adjust the matrix in position against the back as said means move into position, and resilient means for closing them.

20. In a stereotype apparatus, the combination with the back, of jaws on each side to hold the matrix, each of said jaws having a transversely pivoted member and a longitudinally sliding member.

21. In a stereotype apparatus, the combination with the back, of jaws on each side to hold the matrix, one of the jaws having a spring operated member to engage the longitudinal edge of the matrix and automatically position it.

22. In a stereotype apparatus, the combination with the back, of jaws on each side thereof each consisting of a pivoted member and a sliding member, a shaft to operate said members, and keys and springs cooperating with the shaft to move said members.

23. In a stereotype apparatus, the combination with the back and core, of jaws for holding the matrix each of which has a pivoted member and a sliding member, and a single means to move the pivoted members to position the matrix, and to move the sliding members to clamp the matrix in position.

24. In a stereotype apparatus, the combination with the back and core, of jaws for holding the matrix each of which has a pivoted member and a sliding member, means to move the pivoted members to position the matrix, means to move the sliding members to clamp the matrix, and yielding means to hold the jaws in the clamping position.

25. In a stereotype apparatus, the combination with a fixed upright back and a core movable to and from said back and having side strips, of matrix holding strips movable on the sides of the back and adapted to form with the side strips on the core the side closures for the casting chamber.

26. In a stereotype apparatus, the combination with the back and core, of a tail piece pivoted to the core and adapted to fit the back, and means to fasten the tail piece in position over the core.

27. In a stereotype apparatus, the combination with a fixed upright back and a core movable to and from the back, of matrix holders, and means to move the matrix holders into and out of operative position independently of the core.

28. In a stereotype casting apparatus, the combination with a fixed back, of a movable core, a carriage movable toward and from the back, means carried by the core for holding the upper end of the matrix against the back, and means on the carriage for holding the lower end of the matrix against the back and closing the bottom of the casting chamber.

29. In a stereotype casting apparatus, the combination with a back, of a core movable toward and from the back, a carriage movable toward and from the back, means carried by the core for holding the upper end of the matrix against the back, means on the carriage for holding the lower end of the matrix against the back, and means on the back for clamping the sides of the matrix.

30. In a stereotype casting apparatus, the combination with a back, of a core movable toward and from the back, a carriage movable toward and from the back, means carried by the core for holding the upper end of the matrix against the back, means on the carriage for holding the lower end of the matrix against the back and closing the bottom of the casting chamber, means on the back for clamping the sides of the matrix, and means carried by the core for raising the cast plate from the core, said matrix side clamping means and said plate lifting means constituting the side walls of the casting chamber.

31. In a stereotype casting apparatus, the combination with a fixed upright back, of a core movable up to the back to form a casting chamber and away from the back to deliver the cast plate, and means adapted to position and hold the matrix in the back before the core is moved to casting position and to release the matrix while the parts are in casting position.

32. In a stereotype casting apparatus, the combination with a fixed upright back, of a core adapted to deliver a cast plate in a horizontal position, means for rocking the core to a vertical position and moving it up to the back to form a casting chamber, matrix holding means on each side of the back adapted to adjust the matrix in position against the back as said means are moved into holding position, means for moving said matrix holding means into holding position before the core is moved up to the back and for moving said matrix holding means to releasing position before the core is moved away from the back to deliver the cast plate.

33. In a stereotype plate casting apparatus, the combination of two separable members together constituting, when in contact, the lateral walls of a casting box, with a bottom member adapted to close the bottom of the mold cavity and to assist in supporting one of said separable members.

34. In a stereotype plate casting apparatus, the combination of a pair of separable members constituting the side walls of a casting box, with a bottom ring for receiving one of said separable members movable independently of both members laterally toward one of them.

35. In a stereotype plate casting apparatus, the combination with a back and core constituting the mold walls of an upright casting box, said core being movable from the back, with a movable bottom ring for closing the bottom of the mold and holding the bottom of the matrix, and a tail sheet at the top of the mold for holding the top of the matrix, said tail sheet being removable from the back with the core.

36. In a stereotype plate casting apparatus, the combination of a fixed back, a movable core adapted to move toward and from the fixed back, and an adjustable tail sheet carried by the movable core, and adapted to rest against the wall of the fixed back during casting, and having means for engaging the edge of the matrix to hold it in position.

37. In a stereotype plate casting apparatus, the combination of a fixed back, a movable core adapted to move toward and from the fixed back, a tail sheet carried by the movable core and adapted to rest against the wall of the fixed back during casting, and having means for engaging the edge of the matrix to hold it in position, said tail sheet being pivotally connected with the movable core and being adapted to swing on its pivot away from the core after being removed from the back.

38. In a stereotype plate casting apparatus, the combination of a fixed upright back, a core movable into the back and also movable into a position transverse thereto, a tail sheet pivoted on the core at the side thereof on an axis longitudinal of the core, a latch movable with the tail sheet, and means for holding said latch when the tail sheet is in open position.

39. In a stereotype plate casting apparatus, the combination with a back, of a convex core, means for moving the core from the back with the cast plate thereon to a position in which the straight edges of the core are at the bottom, and means connected with the core moving means for lifting said straight edges to free the plate from the core.

40. In a stereotype plate casting apparatus, the combination with a back, of a core movable toward and from the same, plate lifters on the core, means for operating the plate lifters, and matrix jaws, one on each side of the back, said matrix jaws and lifters constituting the side walls of the casting chamber between the back and core when the parts are in casting position.

41. In a stereotype plate casting apparatus, the combination with a finishing device having stops, of a core adapted to support the cast plate in position to be delivered to the finishing device and having means for forming projections on the concave surface of the riser of each plate in position to register with said stops.

This specification signed and witnessed this 22nd day of April A. D., 1909.

CHARLES EDWARD HOPKINS.

Signed in the presence of—
CARL EARL BERNDT,
FRANK KENNINGER.